(12) United States Patent
Matsumoto (10) Patent No.: US 7,447,172 B2
(45) Date of Patent: Nov. 4, 2008

(54) MEDIA SYNCHRONIZING SYSTEM AND SERVICE PROVIDING METHOD FOR USING THE SAME

(75) Inventor: Koichi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 908 days.

(21) Appl. No.: 10/864,443

(22) Filed: Jun. 10, 2004

(65) Prior Publication Data

US 2004/0252726 A1 Dec. 16, 2004

(30) Foreign Application Priority Data

Jun. 12, 2003 (JP) ............................. 2003-167223

(51) Int. Cl.
*H04B 7/212* (2006.01)
(52) U.S. Cl. ...................... 370/324; 370/304; 370/350; 370/503; 455/41.2; 709/231
(58) Field of Classification Search .................. 370/324, 370/304, 350, 503, 225; 455/41.2; 709/231; 707/101, 104
See application file for complete search history.

(56) References Cited

U.S. PATENT DOCUMENTS

| 6,356,795 | B1 * | 3/2002 | Barthel et al. ................. 700/82 |
| 6,710,815 | B1 * | 3/2004 | Billmaier et al. ............. 348/515 |
| 7,088,774 | B1 * | 8/2006 | Moni et al. ............ 375/240.16 |
| 7,139,858 | B2 * | 11/2006 | Nakajima .................... 710/300 |
| 2002/0103919 | A1 * | 8/2002 | Hannaway ................. 709/231 |
| 2003/0084205 | A1 * | 5/2003 | Nakajima .................... 709/400 |
| 2005/0007951 | A1 * | 1/2005 | Lapuh et al. ................ 370/225 |
| 2005/0166233 | A1 * | 7/2005 | Beyda et al. .................. 725/46 |
| 2005/0229227 | A1 * | 10/2005 | Rogers ....................... 725/115 |
| 2006/0206492 | A1 * | 9/2006 | Lipscomb et al. ............. 707/10 |
| 2007/0258595 | A1 * | 11/2007 | Choy ......................... 380/278 |

FOREIGN PATENT DOCUMENTS

| JP | 2001-333030 | 11/2001 |
| JP | 2002-63505 | 2/2002 |
| JP | 2002-77073 | 3/2002 |
| JP | 2002-118828 | 4/2002 |
| JP | 2002-176638 | 6/2002 |
| JP | 2003-067507 | 3/2003 |

* cited by examiner

*Primary Examiner*—Minh D Dao
(74) *Attorney, Agent, or Firm*—Dickstein Shapiro LLP (57) ABSTRACT

The invention provides a media synchronizing system capable of achieving various kinds of services synchronized with delivery of media to users. A synchronization data decoding unit 114 makes a reference to an internal clock 112, determines a command execution time from a synchronization data starting time recorded in synchronization data, and a command execution time period, decodes command types recorded in synchronization data 22, and sends command information to media synchronization command executing units 12-1 to 12-n. A command recognizing means 122 of the media synchronization command executing units 21-1 to 12-n recognizes a command from the received information, and sends execution instructions to a command executing unit 123. The command executing unit 123 operates based on the received execution instructions. A media receiving unit 13 restores and regenerates delivery data delivered from a media delivery service proprietor system 4.

42 Claims, 6 Drawing Sheets

FIG. 2

| OBJECT ID |  |
|---|---|
| EXECUTING MEANS TYPE ID | |
| STARTING TIME (YEAR, MONTH, DATE, AND TIME OF THE DAY) | |
| YEAR xxxx, MONTH yy, DATE zz, aa:bb:cc | |
| EXECUTION TIME PERIOD | COMMAND TYPE |
| 7 MINUTES AND 31 SECONDS | COMMAND #1 |
| 15 MINUTES | COMMAND #2 |
| 28 MINUTES AND 1 SECOND | COMMAND #3 |

MEDIA SYNCHRONIZING SYSTEM AND SERVICE PROVIDING METHOD FOR USING THE SAME

BACKGROUND OF THE INVENTION

1. Field of the Invention

The present invention relates to a media synchronizing system and a service provision method using the same, and in particular to a method for delivering media to media receiving means such as the television and radio.

2. Description of Related Art

Heretofore, delivery of media to media receiving means such as the television and radio has been limited to delivery of information such as images and sounds capable of being superimposed on media outputting means. In the television, for example, alphabet or character (text) multiplex broadcasting such as captions and sound multiplex broadcasting such as output in foreign languages are known in addition to normal images and sounds. Such information to be delivered is limited to information that can be outputted from a display or speaker provided in a television apparatus.

As techniques of the above text multiplex broadcasting and sound multiplex broadcasting and the like, a method of multiplexing (superimposing) contents and scenario data and regenerating the same (e.g. see Japanese Patent Laid-Open No. 2002-176638 (pp. 10-12, FIG. 1), a method of displaying added learning auxiliary data in synchronization with a dynamic picture teaching material (e.g. see Japanese Patent Laid-Open No. 2003-067507 (pp. 11 and 12, FIG. 1), and the like are known.

In the conventional method for delivering media, there is no means for delivering other information to an apparatus other than media receiving means such as the television or radio in synchronization with media delivered to the television or radio. In the conventional method for delivering media, for realizing such means, special image signals or sound signals different from what are originally intended are included in delivery data, and they are different from original images or sounds delivered to the television or radio, thus causing users to feel uncomfortable.

Furthermore, in the conventional method for delivering media, even if the above means for delivering other information in synchronization with media delivered to the television or radio is realized, a special apparatus for identifying special image signals or sound signals in delivery data should be introduced.

Further, in the conventional method for delivering media, if other information is included in delivery data as data other than images or sounds and delivered, a special apparatus for extracting corresponding information from delivery data is required.

The object of the present invention is to eliminate the above problems and provide a media synchronizing system and a service provision method for use in the same, which can provide service to users in synchronization with media delivery.

SUMMARY OF THE INVENTION

A media synchronizing system according to the present invention is a media synchronizing system including media delivering means for delivering media to a user terminal receiving and outputting the media including at least images and sounds through a communication medium including at least wireless or wire communication, the media synchronizing system comprising synchronization data delivering means for delivering synchronization data synchronized with the media to synchronization data executing means different from the user terminal through a communication medium independent of the communication medium.

A service provision method according to the present invention is a service provision method in a media synchronizing system delivering media to a user terminal receiving and outputting the media including at least images or sounds from a media delivering system through a communication medium including at least wireless or wire communication, wherein synchronization data synchronized with the media is delivered to synchronization data executing means different from the user terminal through a communication medium independent of the communication medium.

That is, the media synchronizing system of the present invention provides a system synchronizing images, music, sounds and the like delivered to a media receiver such as the television or radio with means other than the media receiver receiving other information delivered in synchronization therewith, and a business model for provision of the service.

More specifically, in the media synchronizing system of the present invention, a media delivery proprietor creates delivery data of images, music, sounds or the like related to media synchronization command executing means, and delivers the delivery data to users through a wireless, wire or other medium.

A synchronization data creation proprietor receives delivery data created by the media delivery proprietor and a predetermined time of delivery, and creates synchronization data to be executed in media synchronization command executing means (e.g. a series of command instruction sequences for operating media synchronization command executing means) based on the contents of corresponding delivery data. At least an execution command (which may include an execution time) is recorded in the synchronization data, and the created synchronization data is passed to a synchronization data delivery service proprietor. The synchronization data delivery service proprietor delivers the synchronization data to users through the internet.

The user joins delivery service provided by the synchronization data delivery service proprietor to acquire synchronization data in an information apparatus through the internet with the information apparatus constituted by a computer such as a personal computer or home server connected to the internet, and the like. The user should purchase media synchronization command executing means when joining the above delivery service. In the information apparatus, the acquired synchronization data is executed by software.

When the execution time is reached, the above executed synchronization data is sent to media synchronization command executing means as a command through a wire/wireless network. When receiving the command, the media synchronization executing means executes the received command contents based on a previously recorded method of executing the command, whereby the command contents are executed in synchronization with images, sounds and music delivered by the media delivery proprietor.

DESCRIPTION OF THE PREFERRED EMBODIMENTS

Figure 1:
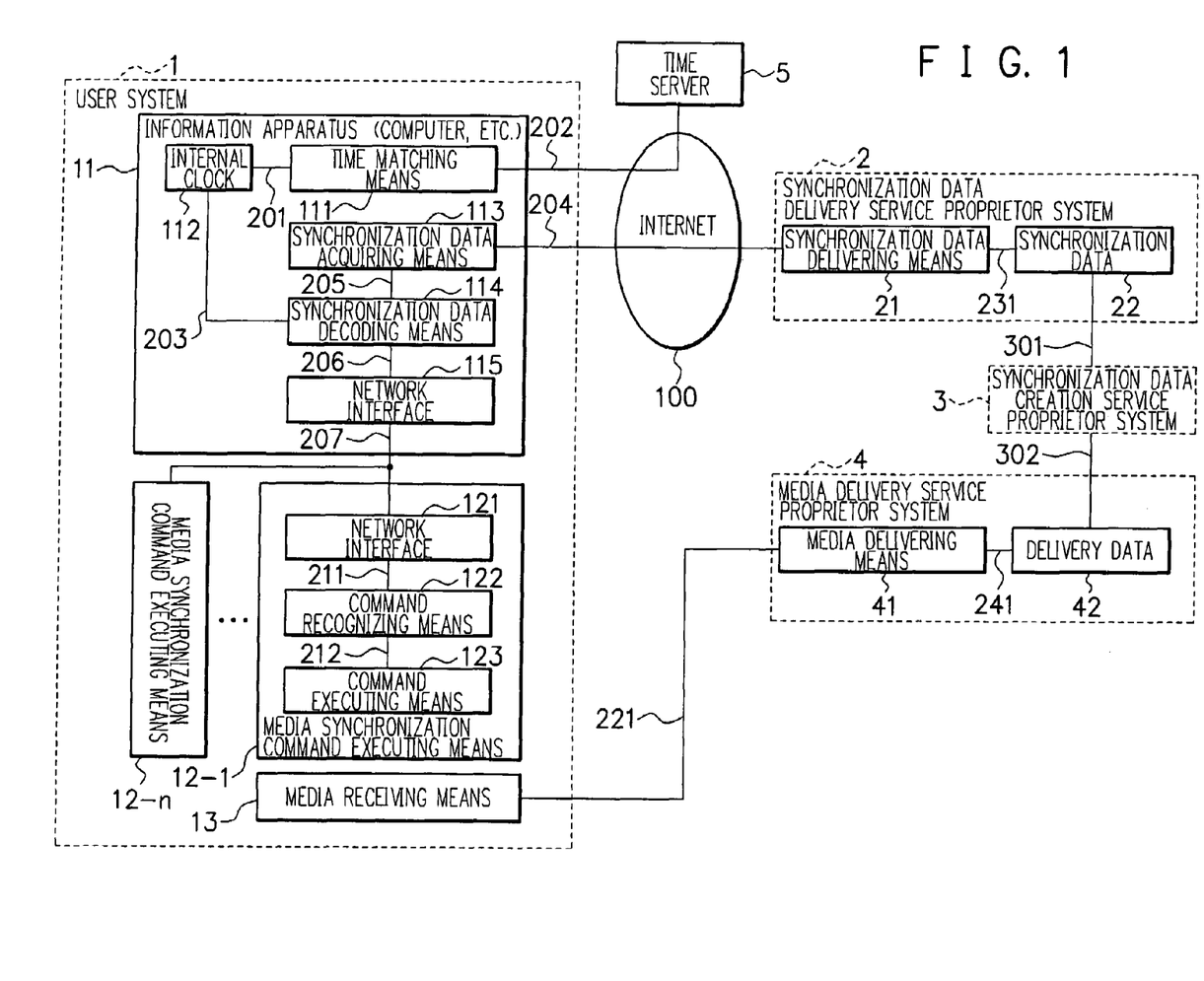
FIG. 1 is a block diagram showing the configuration of a media synchronizing system according to one Example of the present invention.

Examples of the present invention will be described with reference to the drawings. FIG. 1 is a block diagram showing the configuration of a media synchronizing system according to one Example of the present invention. In FIG. 1, the media synchronizing system is comprised of a user system 1, a synchronization data delivery proprietor system 2, a synchronization data creation service proprietor system 3, a media delivery service proprietor system 4 and a time server 5.

The user system 1 is comprised of an information apparatus 11 constituted by a computer such as a personal computer, home server, cellular phone terminal or PDA (personal digital assistant), and the like, media synchronization command executing means (media synchronization command executing apparatus(es)) 12-1 to 12-n, and media receiving means (media receiver) 13. The information apparatus 11 is comprised of time matching means 111, an internal clock 112, synchronization data acquiring means 113, synchronization data decoding means 114 and a first network interface 115.

The media synchronization command executing means 12-1 to 12-n is each comprised of a second network interface 121, a command recognizing means 122 and a command executing means 123. Furthermore, in FIG. 1, only the internal structure of media synchronization command executing means 12-1 is shown, and the media synchronization command executing means 12-1 to 12-n includes motion control apparatuses of toys, light fittings, air conditioning equipment and furniture (e.g. apparatuses for vibrating and tilting chairs, etc.) and projection apparatuses [projector of light (planetarium, etc.) and odors (odor generator)]. Furthermore, in FIG. 1, more than one media synchronization command executing means 12-1 to 12-n are shown, but an operation can be performed with one media synchronization command executing means and in the case of more than one media synchronization command executing means, they can be operated alone or in association with other apparatuses.

The synchronization data delivery proprietor system 2 comprises synchronization data delivering means 21 and synchronization data 22, and the media delivery service proprietor system 4 comprises media delivering means 41 and delivery data 42.

The information apparatus 11 of the user system 1 and media synchronization command executing means 12-1 to 12-n are connected through a network 207 of wireless communication [e.g. short-distance wireless communication such as Bluetooth (R), IEEE802. 11a, IEEE802. 11b and IEEE802. 11g, infrared-ray communication, etc.], wire communication or the like.

The information apparatus 11, the synchronization data delivering means 21 of the synchronization data delivery service proprietor system 2 and the time server 5 are connected to the internet 100. The media delivering means 41 of the media delivery service proprietor system 4 is connected to the media receiving means 13 through a delivery medium 221 including the internet of wireless communication, wire communication or the like. Here, the media receiving means 13 is a usual receiver such as the television or radio.

Furthermore, the time matching means 111 of the information apparatus 11 is connected to the internal clock 112, and connected to the time server 5 through the internet 100, and matches the time in the internal clock 112 to the standard time from the time server 5. The internal clock 112 is connected to the synchronization data decoding means 114. Furthermore, the time matching means 111 may receive time information from an electric wave satellite for the time server 5.

The synchronization data acquiring means 113 is connected to the synchronization data decoding means 114, and connected to the synchronization data delivering means 21 through the internet 100. The synchronization data decoding means 114 is connected to the first network interface 115. The first network interface 115 of the information apparatus 11 is connected to the second network interface 121 of the media synchronization command executing means 12-1 to 12-n through the network 207 of wireless communication, wire communication or the like.

The command recognizing means 122 of the media synchronization command executing means 12-1 to 12-n is connected to the second network interface 121, and connected to the command executing means 123.

Figure 2:
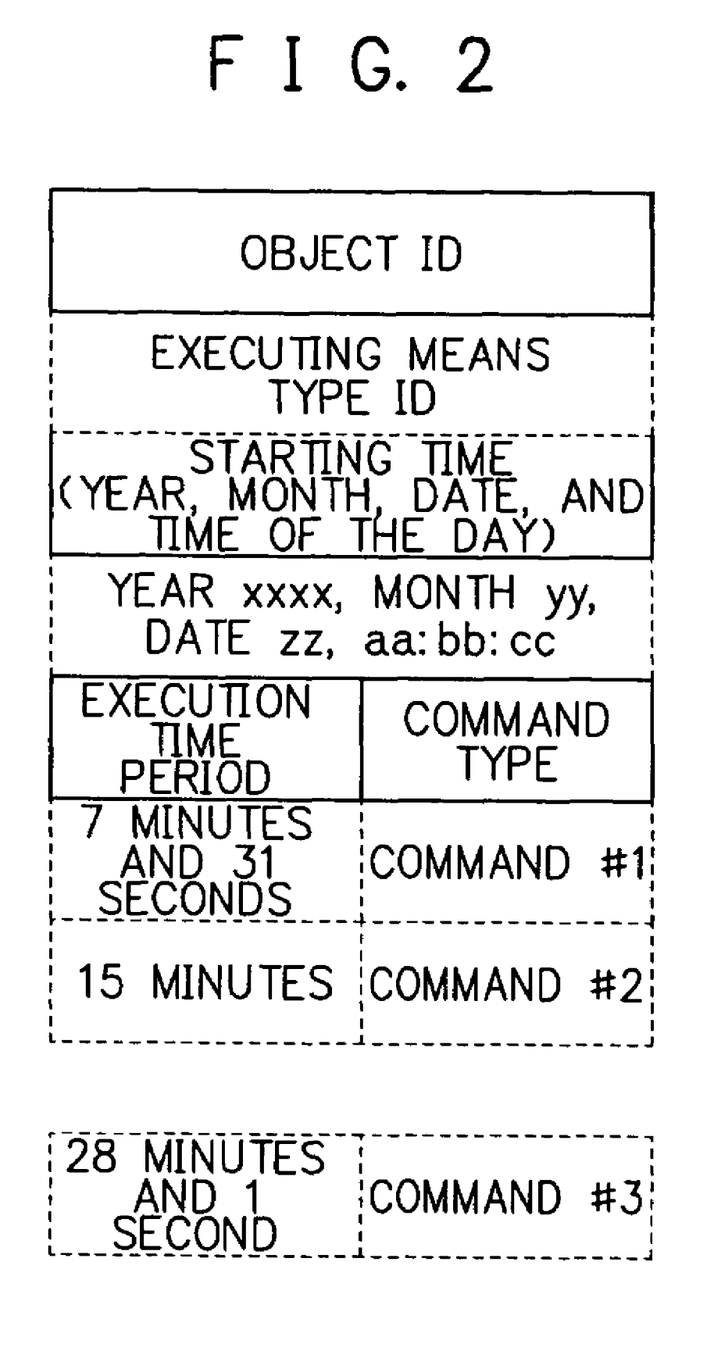
FIG. 2 shows the configuration of synchronization data delivered in one Example of the present invention.

FIG. 2 shows the configuration of synchronization data (stored in the server 42) delivered in one Example. In FIG. 2, this synchronization data is comprised of an object ID (executing means type ID), a starting time (year, month, date and time of the day) (year xxxx, month yy, date zz, (hour)aa: (min)bb: (sec)cc), execution time periods (7 minutes and 31 seconds), (15 minutes) and (28 minutes and 1 second), and command types (command #1), (command #2) and (command #3).

Figure 3:
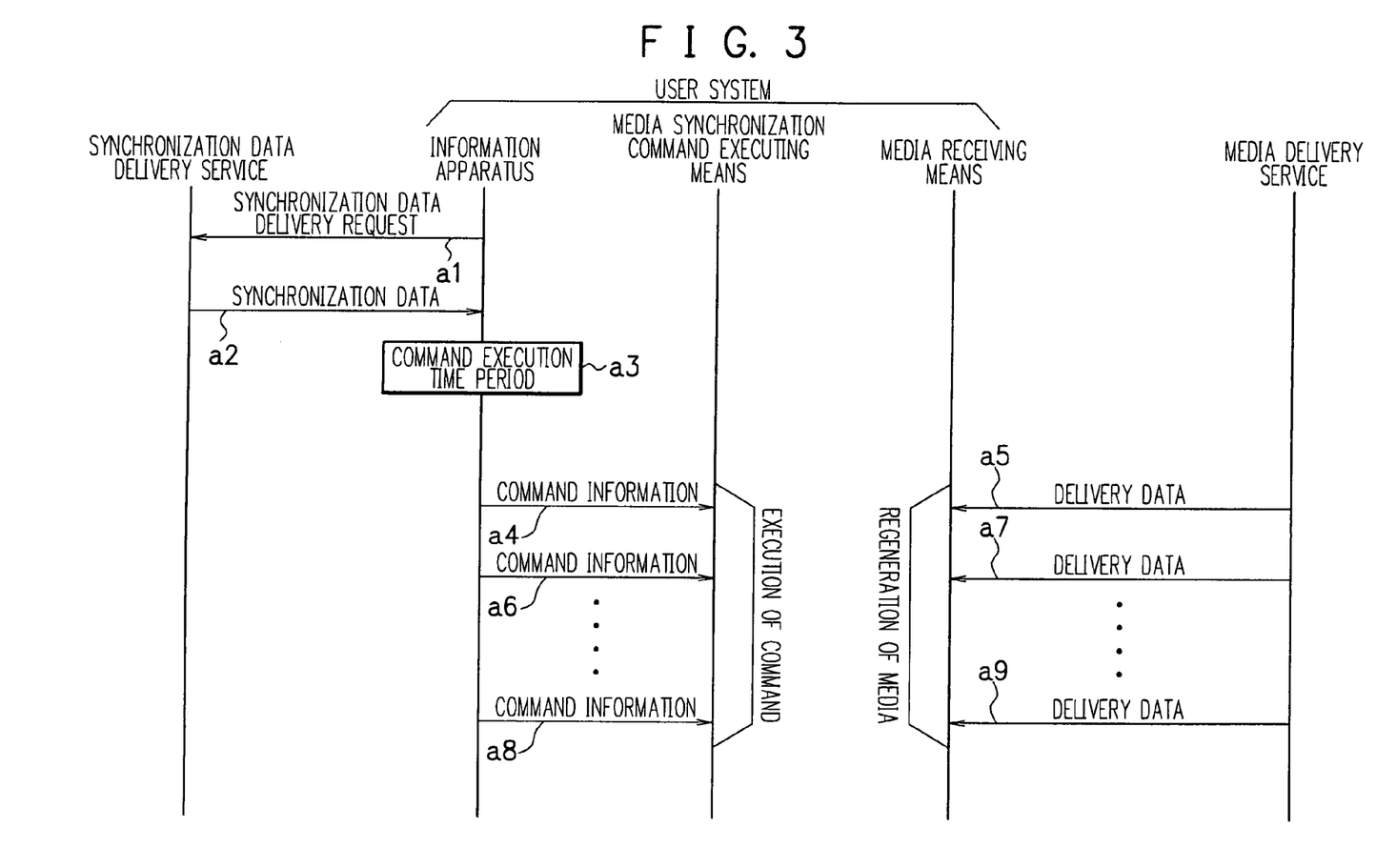
FIG. 3 is a sequence chart showing the operations of the media synchronizing system according to one Example of the present invention.

FIG. 3 is a sequence chart showing the operations of the media synchronizing system according to one Example of the present invention. The operations of the media synchronizing system according to one Example of the present invention, namely procedures for operating the media synchronization command executing means 12-1 to 12-n will be described with reference to FIGS. 1 to 3.

Time matching means 111 is connected to the time server 5 through the internet 100, and acquires a standard time from the time server 5. The time matching means 111 passes the acquired standard time to the internal clock 112 to update the time in the internal clock 112 with the acquired standard time.

The media delivery service proprietor system 4 creates usual delivery data 42 of the television, radio or the like, and media delivering means 41 delivers the delivery data 42 at predetermined delivery time. The synchronization data creation service proprietor system 3 receives the delivery data 42 created by the media delivery service proprietor system 4, creates synchronization data 22 (e.g. a series of command instruction sequences for operating media synchronization command executing means 12-1 to 12-n) from the contents and predetermined time of delivery of the delivery data 42, and provides the synchronization data 22 to the synchronization data delivery service proprietor system 2.

As shown in FIG. 2, an object ID for identifying the media synchronization command executing means 12-1 to 12-n, a starting time at which execution of the synchronization data 22 is started, periods of time elapsing after the starting time, which represent a time at which the command is executed, and command types are recorded in the synchronization data 22.

The synchronization data delivery service proprietor system 2 delivers the provided synchronization data 22 to the information apparatus 11 of the user system 1 through the internet 100 by synchronization data delivering means 21. A request from synchronization data acquiring means 113 of the information apparatus 11 of the user system is received, and the synchronization data 22 is delivered according to the request.

The synchronization data acquiring means 113 of the information apparatus 11 accesses the synchronization data delivering means 21 before a predetermined media delivery time, makes a request for delivery of the synchronization data 22 (reference symbol al in FIG. 3), and acquires the synchronization data 22 from the synchronization data delivering means 21 (reference symbol a2 in FIG. 3).

The acquired synchronization data 22 is passed to synchronization data decoding means 114. However, the synchronization data acquiring means 113 may store the synchronization data 22 acquired before the predetermined media delivery time, and pass the synchronization data 22 to the synchronization data decoding means 114, or may pass directly to the synchronization data decoding means 114 the synchronization data 22 acquired sequentially in real time just before the predetermined media delivery time.

The synchronization decoding means 114 makes a reference to the internal clock 112, determines a command execution time from the synchronization starting time and the command execution time period recorded in the synchronization data, decodes the command type recorded in the synchronization data 22, and sends command information to the first network interface 115 (reference symbols a3, a4, a6 and a8 in FIG. 3).

The first network interface 115 sends the received command information to the second network interface 121 of corresponding one of the media synchronization command executing means 12-1 to 12-n through the command information network 207.

The second network interface 121 of corresponding one of the media synchronization command executing means 12-1 to 12-n sends the command information received from the first network interface 115 of the information apparatus 11 to command recognizing means 122. The command recognizing means 122 recognizes a command from the received command information, and sends execution instructions to command executing means 123. The command executing means 123 operates based on the received execution instructions.

The media receiving means 13 receives delivery data 42 delivered from the media delivering means 41 of the media delivery service proprietor system 4, and restores/regenerates the delivery data 42 (reference symbols a5, a7 and a9 in FIG. 3). Since the same time is recorded in the predetermined time delivered from the media delivery service proprietor system 4 and the synchronization data starting time recorded in the synchronization data 22, delivery data regenerated in the media receiving means 13 is synchronized with a command operation executed in one of the media synchronization command executing means 12-1 to 12-n.

In this way, in this Example, service can be provided to users (user systems or user terminal) in synchronization with delivery of media by delivery of media through wireless communication, wire communication or the like, and delivery of synchronization data through the internet 100.

Furthermore, in this Example, by delivery of media sent through wireless communication, wire communication or the like, and delivery of synchronization data through the internet 100, and execution of commands for delivery of images, music, letters or sounds other than the delivered media, or performance of other operations by the media synchronization command executing means 12-1 to 12-n, service other than the delivered media can be provided to users in synchronization with delivery of the media. This service is preferably performed for enhancing the sense of reality of media to be delivered, and giving a sense of realism.

Furthermore, in this Example, since delivery of synchronization data through the internet 100 and delivery of media are realized with different routes, no special media receiver is required, and an existing system can be used.

In this Example described above, in the case where media delivered from the media delivery service proprietor system 4 are animation movies and dramas about heroes, toys such as belts, watches and portable terminals used by characters and the like appearing therein are provided with the media synchronization command executing means 12-1 to 12-n for causing emission of light, vibrations or the like at a time when such a toy appears in broadcasting of media, whereby simulated experiences such that children using the toys become characters and the like can be provided.

Furthermore, in this Example, in the case where media delivered from the media delivery service proprietor system 4 are horror movies, circuits controlling light fittings and air conditioning apparatuses in a room are provided with the media synchronization command executing means 12-1 to 12-n, whereby settings can be made so that the interior of the room is darkened or lightened, the temperature in the room can be increased or decreased, and a wind can be produced in synchronization with the scene of the movie, thus making it possible to give to users watching the movie a sense of realism as if they were in the scene of the movie.

Further, in the Example, in the case where media delivered from the media delivery service proprietor system 4 are music, readings of poems, novels and the like, and so on, planetariums for projecting constellations into the room and projection apparatuses such as odor generators are provided with the media synchronization command executing means 12-1 to 12-n, whereby constellations can be projected into the room and odors can be generated in synchronization with the music, readings of poems, novels and the like, and so on, thus making it possible to cause users listening to the music, readings of poems, novels and the like, and so on to imagine the scene and feel a sense of realism as if they were a real world.

Further, in this Example, in the case where media delivered from the media delivery service proprietor system 4 are adventurous action movies, motion controlling apparatuses of furniture (e.g. apparatuses for vibrating and tilting chairs, etc.) are provided with media synchronization command executing means 12-1 to 12-n, whereby furniture is moved (e.g. chairs are vibrated and tilted) in synchronization with the scene of the movie, thus making it possible to give to users watching the movie a sense of realism as if they were in the scene of the movie or they realized the scene before their eyes.

On the other hand, in this Example, media delivered from the media delivery service proprietor system 4 are programs such as animations and dramas broadcasted every week, stuffed toys and character toys (e.g. dolls such as figures, etc.) appearing in the programs are provided with media synchronization command executing means 12-1 to 12-n, whereby different. words are picked up [execution scenarios (execution contents) of media synchronization command executing means 12-1 to 12-n are made variable] in synchronization with the progress (e.g. number of watches) of the programs, thus making it possible to give to users watching the program a sense of realism as if characters appearing in the program grew with progress of the program. Furthermore, the above specific examples can be used in mutual combination.

Figure 4:
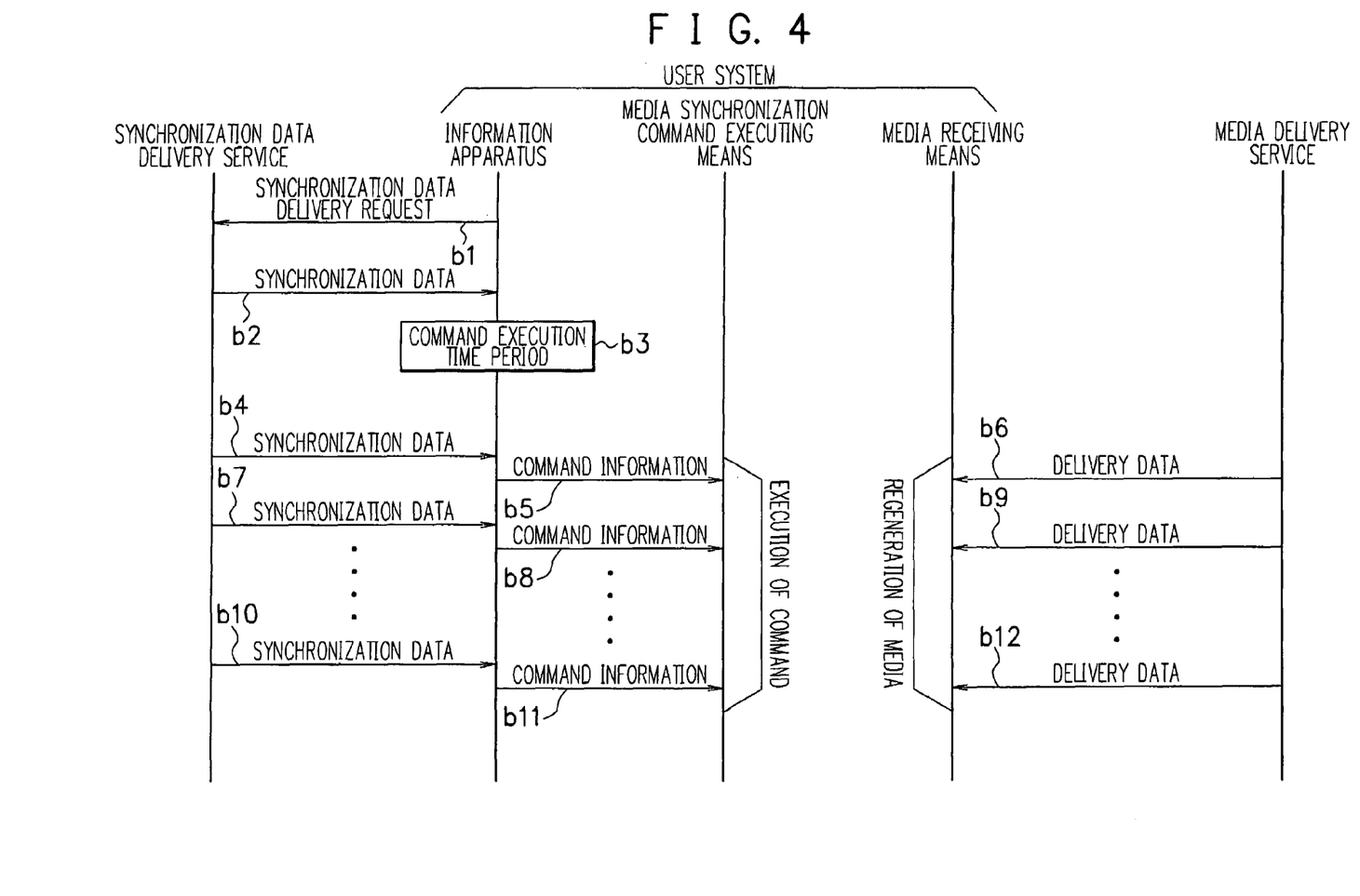
FIG. 4 is a sequence chart showing the operations of the media synchronizing system according to another Example of the present invention.

FIG. 4 is a sequence chart showing the operations of the media synchronizing system according to another Example of the present invention. The configuration of the media synchronizing system according to another Example of the present invention is same as the configuration of one Example of the present invention shown in FIG. 1, and synchronization data that is used is also same as synchronization data 22 that is used in one Example of the present invention shown in FIG. 2. The operations of the media synchronizing system according to another Example of the present invention, namely procedures for operating media synchronization command executing means 12-1 to 12-n will be described with reference to FIGS. 1, 2 and 4.

In another Example of the present invention, synchronization data acquiring means 113 accesses synchronization data delivering means 21 before a predetermined media delivery time, makes a request for delivery of synchronization data 22 (reference symbol b1 in FIG. 4), and acquires the synchronization data 22 from the synchronization data delivering means 21 (reference symbol b2 in FIG. 4). The synchronization data acquiring means 113 passes directly to synchronization data decoding means 114 the synchronization data 22 acquired sequentially in real time just before the predetermined media delivery time (reference symbols b4, b7 and b10 in FIG. 4).

The synchronization decoding means 114 makes a reference to the internal clock 112, determines a command execution time from the synchronization starting time and the command execution time period recorded in the synchronization data, decodes the command type recorded in the synchronization data 22, and sends command information to the first network interface 115 (reference symbols b3, b5, b8 and b11 in FIG. 4).

The first network interface 115 sends the received command information to the second network interface 121 of corresponding one of the media synchronization command executing means 12-1 to 12-n through the command information network 207.

The second network interface 121 of corresponding one of the media synchronization command executing means 12-1 to 12-n sends the command information received from the first network interface 115 of the information apparatus 11 to command recognizing means 122. The command recognizing means 122 recognizes a command from the received command information, and sends execution instructions to command executing means 123. The command executing means 123 operates based on the received execution instructions.

The media receiving means 13 receives delivery data 42 delivered from the media delivering means 41 of the media delivery service proprietor system 4, and restores/regenerates the delivery data 42 (reference symbols b6, b9 and b12 in FIG. 4).

Since the same time is recorded in the predetermined time delivered from the media delivery service proprietor system 4 and the synchronization data starting time recorded in the synchronization data 22, delivery data regenerated in the media receiving means 13 is synchronized with a command operation executed in one of the media synchronization command executing means 12-1 to 12-n. Furthermore, in this Example, simultaneous relay broadcasts of base ball games, succor games and the like can be set in media to be delivered, the media can be brought into correspondence with the media synchronization command executing means, and command operations can be synchronized with this means.

Figure 5:
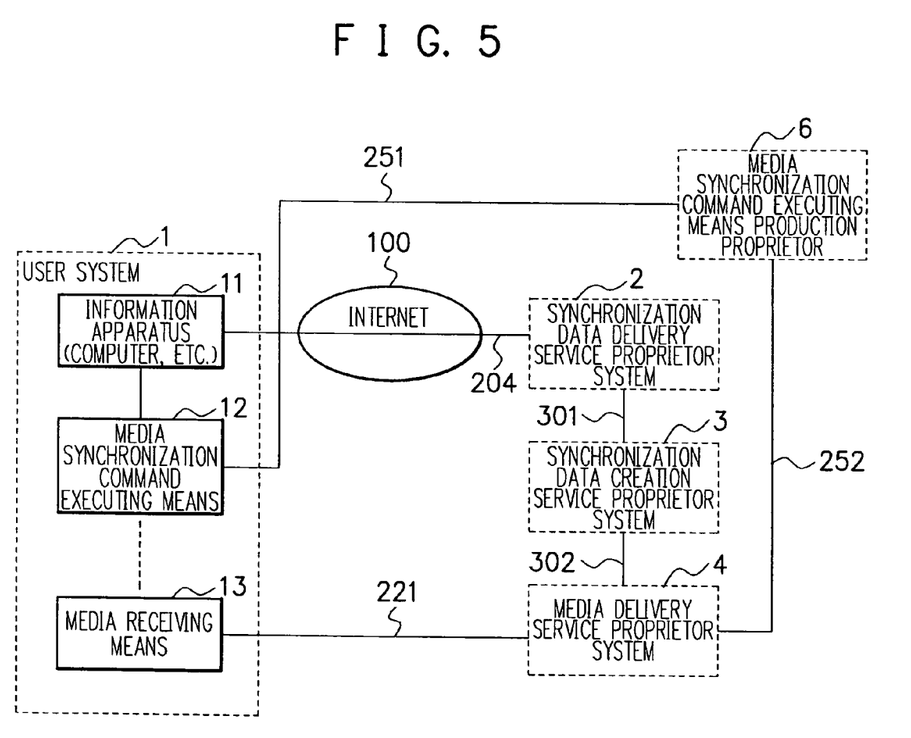
FIG. 5 is a block diagram showing the configuration of the media synchronizing system according to another Example of the present invention.

FIG. 5 is a block diagram showing the configuration of the media synchronizing system according to another Example of the present invention. In FIG. 5, the configuration of a service provision system including a business model according to another Example of the present invention is shown.

In FIG. 5, the configuration of another Example of the present invention is same as the configuration of the media synchronizing system according to one Example of the present invention shown in FIG. 1 except that a media synchronization command executing means production proprietor 6 is added, and same symbols are given to same configuration elements. Furthermore, the operations of same configuration elements are same as those in one Example of the present invention and other Examples. Furthermore, examples of operations are described using one media synchronization command executing means 12 in this Example, but a plurality of media synchronization command executing means 12-1 to 12-n can be used at a time or independently.

The media synchronization command executing means production proprietor 6 makes a contract/cooperation such as sponsorship for the media delivery service proprietor system 4 (processing 252 in FIG. 5) for producing and selling media synchronization executing means 12 related to media such as television programs, videos, music and sounds delivered by the media delivery service proprietor system 4 (processing 251 in FIG. 5).

The media delivery service proprietor system 4 creates delivery data such as images, music and sounds related to delivered media to be executed by the media synchronization command executing means 12, and delivers delivery data to the user system 1 through a wireless/wire medium or other medium (processing 221 in FIG. 5).

The synchronization data creation service proprietor system 3 receives the delivery data created by the media delivery service proprietor system 4 and a predetermined delivery time (processing 302 in FIG. 5), and creates synchronization data to be executed by the media synchronization command executing means 12 based on the corresponding delivery data contents. An execution time and an execution command are recorded in the synchronization data, and the created synchronization data is passed to the synchronization data delivery service proprietor system 2 (processing 301 in FIG. 5).

The synchronization data delivery service proprietor system 2 delivers the synchronization data to the user system 1 using the internet 100 (processing 204 in FIG. 5). The user system 1 purchases the media synchronization command executing means 12 from the media synchronization command executing means production proprietor 6 (processing 251 in FIG. 5), joins the delivery service provided by the synchronization data delivery service proprietor system 2, pays a usage fee to the synchronization data delivery service proprietor system 2, and is provided with software or hardware implemented on the information apparatus 11 constituted by a computer such as a personal computer or home server connected to the internet 100. This can be the media synchronization command executing means 12 described above.

The user system 1 acquires synchronization data in the information apparatus 11 through the internet 100 by the information apparatus 11 connected to the internet 100. In the information apparatus 11, the synchronization data is executed by software or hardware, and when the execution time is reached, a command is sent to the media synchronization command executing means 12 through a wire/wireless network. The media synchronization command executing means 12, which receives the command, executes the contents of the received command based on a previously recorded method of executing the command. The execution of the command is performed in synchronization with images, sounds and music delivered by the media delivery service proprietor system 4.

In this way, in the Example, in addition to the effect of one Example of the present invention described above, the sales of the apparatus having the media synchronization command executing means 12 implemented thereon is extended and the user who purchased the apparatus can operate the apparatus, thus making it possible to obtain a synergistic effect with extension of use of delivery of media.

Furthermore, in the Example, when a commercial or the like is delivered, a command execution operation is performed by the media synchronization command executing means 12, whereby an effect of promoting the viewing of the commercial can be obtained.

Figure 6:
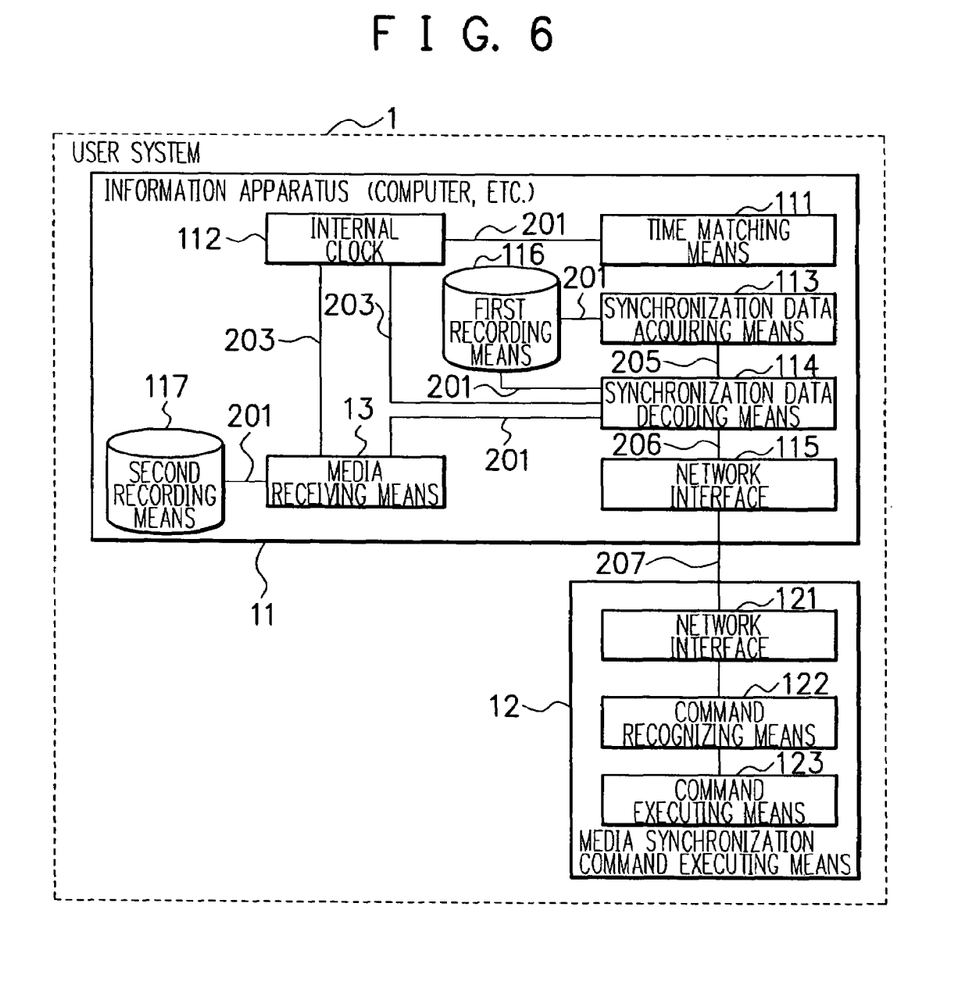
FIG. 6 is a block diagram showing the configuration of the media synchronizing system according to still another Example of the present invention.

FIG. 6 is a block diagram showing the configuration of the media synchronizing system according to still another Example of the present invention. In FIG. 6, the configuration of still another Example of the present invention is same as the configuration of one Example of the present invention shown in FIG. 1 described above except that first recording means 116 and second recording means 117 are provided in the information apparatus 11, and like symbols are given to like elements. Furthermore, the operations of same elements are same as those in one Example of the present invention and other Examples.

In the information apparatus 11, the first recording means 116 is connected to synchronization data acquiring means 113 and synchronization data decoding means 114, and media receiving means 13 is connected to the internal clock 112, the synchronization data decoding means 114 and the second recording means 117 in the information apparatus 11.

The media receiving means 13 receives delivery data from media delivering means 41, makes a reference to a time from the internal clock 112, and records a time when recording is started, and delivery data 42 delivered to the media receiving means 13 from the media delivering means 41 in the second recording means 117. The synchronization data acquiring means 113 makes a request to synchronization data delivering means 21 to acquire synchronization data 22, and records the synchronization data in the first recording means 116.

The synchronization data decoding means 114 reads synchronization data from the first recording means 116, makes a reference to the recording starting time recorded in the second recording means 117 through the media receiving means 13, and compares a starting time of synchronization data with the recording starting time. If there is a difference as a result of the comparison, timing in which synchronization data recorded in the first recording means 116 is executed is shifted (delayed) from timing in which delivery data recorded in the second recording means 117 is regenerated by a differential time in the comparison, whereby synchronization can be provided.

In this way, in this Example, in addition to the effects of one Example of the present invention described above, not only delivery data can be provided in real time, but also various kinds of services other than images, music, texts and sounds can be provided in synchronization with the delivery data if data is regenerated after it is recorded.

As described above, the present invention can achieve various kinds of services synchronized with delivery of media to users by means of the configurations and operations described above.

What is claimed is:

1. A media synchronizing system including media delivering part for delivering media through a first communication medium including wireless communication or wire communication to a user terminal receiving and outputting said media including images or sounds, said media synchronizing system comprising:
   synchronization data delivering part for delivering synchronization data synchronized with said media to a synchronization data executing part different from said user terminal through a second communication medium; and
   the synchronization data executing part, comprising
      command recognizing part for recognizing command sequences included in said synchronization data, and
      command executing part for executing the command sequences detected by said command recognizing part,
   wherein said command sequences are stored in said user terminal, and sequentially sent to said synchronization data executing part from the time of delivery of said media.

2. The media synchronizing system according to claim 1, wherein said command sequences are associated with a time of delivery of said media.

3. The media synchronizing system according to claim 2, wherein said command sequences are sequentially sent from said synchronization data delivering part to said user terminal in real time from the time of delivery of said media.

4. The media synchronizing system according to claim 3, wherein said command sequences make the execution contents of said synchronization data executing part variable in synchronization with the progress of said media.

5. The media synchronizing system according to claim 4, wherein said synchronization data executing part is made attachable to/detachable from said user terminal.

6. The media synchronizing system according to claim 3, wherein said synchronization data executing part is made attachable to/detachable from said user terminal.

7. The media synchronizing system according to claim 2, wherein said command sequences make the execution contents of said synchronization data executing part variable in synchronization with the progress of said media.

8. The media synchronizing system according to claim 7, wherein said synchronization data executing part is made attachable to/detachable from said user terminal.

9. The media synchronizing system according to claim 2, wherein said synchronization data executing part is made attachable to/detachable from said user terminal.

10. The media synchronizing system according to claim 2, wherein said command recognizing part and said command executing part recognize and execute said command sequences in association with said media.

11. The media synchronizing system according to claim 10, wherein first recording part for recording said synchronization data and second recording part for recording said media and a time when recording of the media is started are included in said user terminal, and
   timing in which said synchronization data is executed is delayed by a difference between the starting time of said synchronization data recorded in said first recording part and said recording starting time recorded in said second recording part.

12. The media synchronizing system according to claim 1, wherein said command sequences make the execution contents of said synchronization data executing part variable in synchronization with the progress of said media.

13. The media synchronizing system according to claim 12, wherein said synchronization data executing part is made attachable to/detachable from said user terminal.

14. The media synchronizing system according to claim 1, wherein said command sequences make the execution contents of said synchronization data executing part variable in synchronization with the progress of said media.

15. The media synchronizing system according to claim 14, wherein said synchronization data executing part is made attachable to/detachable from said user terminal.

16. The media synchronizing system according to claim 14, wherein said command executing part executes said command sequences during delivery of said media to at least one of the television and radio to perform at least one control selected from control of air conditions, control of illumination, control of projection of constellations, control of vibrations and/or impacts on movable chairs, and operation control for toys.

17. The media synchronizing system according to claim 16, wherein said command executing part performs operation control for character dolls when said operation control is operation control for toys.

18. The media synchronizing system according to claim 1, wherein said synchronization data executing part is made attachable to/detachable from said user terminal.

19. The media synchronizing system according to claim 1, wherein first recording part for recording said synchronization data and second recording part for recording said media and a time when recording of the media is started are included in said user terminal, and
  timing in which said synchronization data is executed is delayed by a difference between the starting time of said synchronization data recorded in said first recording part and said recording starting time recorded in said second recording part.

20. The media synchronizing system according to claim 1, wherein said command executing part executes said command sequences during delivery of said media to at least one of the television and radio to perform at least one control selected from control of air conditions, control of illumination, control of projection of constellations, control of vibrations and/or impacts on movable chairs, and operation control for toys.

21. The media synchronizing system according to claim 20, wherein said command executing part performs operation control for character dolls when said operation control is operation control for toys.

22. The media synchronizing system according to claim 1, wherein communication between said user terminal and said synchronization data executing part is achieved by at least one of infrared ray communication and short-distance wireless communication.

23. The media synchronizing system according to claim 1, wherein the second communication medium for delivering said synchronization data is the Internet.

24. A service provision method in a media synchronizing system delivering media from a media delivering system using a first communication medium including at least wireless communication or wire communication to a user terminal receiving and outputting said media including at least images or sounds, the method comprising:
  storing command sequences in said user terminal, and sequentially sending the command sequences to a synchronization data executing part from the time of delivery of said media;
  delivering synchronization data synchronized with said media to synchronization data executing part different from said user terminal through a second communication medium;
  a command recognizing part of said synchronization data executing part recognizing command sequences included in said synchronization data; and
  a command executing part of said synchronization data executing part executing the recognized command sequences.

25. The service provision method according to claim 24, wherein said command sequences are created based on a time of delivery of said media.

26. The service provision method according to claim 25, wherein said command sequences are sequentially sent from said synchronization data delivering part to said user terminal in real time from the time of delivery of said media.

27. The service provision method according to claim 26, wherein said command sequences make the execution contents of said synchronization data executing part variable in synchronization with the progress of said media.

28. The service provision method according to claim 26, wherein said synchronization data executing part is made attachable to/detachable from said user terminal.

29. The service provision method according to claim 26, wherein said command recognizing part and said command executing part recognize and execute said command sequences in association with said media.

30. The service provision method according to claim 26, wherein first recording part for recording said synchronization data and second recording part for recording said media and a time when recording of the media is started are provided in said user terminal, and
  timing in which said synchronization data is executed is shifted by a difference between the starting time of said synchronization data recorded in said first recording part and said recording starting time recorded in said second recording part.

31. The service provision method according to claim 25, wherein said command sequences make the execution contents of said synchronization data executing part variable in synchronization with the progress of said media.

32. The service provision method according to claim 25, wherein said synchronization data executing part is made attachable to/detachable from said user terminal.

33. The service provision method according to claim 25, wherein said command recognizing part and said command executing part recognize and execute said command sequences in association with said media.

34. The service provision method according to claim 25, wherein first recording part for recording said synchronization data and second recording part for recording said media and a time when recording of the media is started are provided in said user terminal, and
  timing in which said synchronization data is executed is shifted by a difference between the starting time of said synchronization data recorded in said first recording part and said recording starting time recorded in said second recording part.

35. The service provision method according to claim 24, wherein said command sequences make the execution contents of said synchronization data executing part variable in synchronization with the progress of said media.

36. The service provision method according to claim 24, wherein said synchronization data executing part is made attachable to/detachable from said user terminal.

37. The service provision method according to claim 24, wherein said command recognizing part and said command executing part recognize and execute said command sequences in association with said media.

38. The service provision method according to claim 24, wherein first recording part for recording said synchronization data and second recording part for recording said media and a time when recording of the media is started are provided in said user terminal, and timing in which said synchronization data is executed is shifted by a difference between the starting time of said synchronization data recorded in said first recording part and said recording starting time recorded in said second recording part.

39. The service provision method according to claim 24, wherein said command executing part executes said command sequences during delivery of said media to at least one of the television and radio to perform at least one control selected from control of air conditions, control of illumination, control of projection of constellations, control of vibrations and/or impacts on movable chairs, and operation control for toys.

40. The service provision method claim 39, wherein said command executing part performs operation control for character dolls when said operation control is operation control for toys.

41. The service provision method according to claim 24, wherein communication between said user terminal and said synchronization data executing part is achieved by at least one of infrared ray communication and short-distance wireless communication.

42. The service provision method according to claim 24, wherein the second communication medium for delivering said synchronization data is the Internet.

* * * * *